United States Patent
Liu et al.

(10) Patent No.: US 11,930,498 B2
(45) Date of Patent: Mar. 12, 2024

(54) TECHNIQUES FOR SCHEDULING SIDELINK COMMUNICATIONS IN MULTIPLE TIME PERIODS

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 304 days.

(21) Appl. No.: 17/468,321

(22) Filed: Sep. 7, 2021

(65) Prior Publication Data

US 2023/0071226 A1 Mar. 9, 2023

(51) Int. Cl.
*H04W 72/12* (2023.01)
*H04L 1/08* (2006.01)
*H04L 1/18* (2023.01)
*H04L 1/1812* (2023.01)
*H04W 72/20* (2023.01)

(52) U.S. Cl.
CPC .............. *H04W 72/20* (2023.01); *H04L 1/08* (2013.01); *H04L 1/1812* (2013.01)

(58) Field of Classification Search
CPC . H04W 72/0446; H04W 84/12; H04W 84/18; H04W 28/04; H04W 28/06; H04W 72/20; H04W 72/1278; H04L 1/08; H04L 1/1812
USPC ......................................................... 370/336
See application file for complete search history.

(56) References Cited

U.S. PATENT DOCUMENTS

| | | | |
|---|---|---|---|
| 2021/0144750 A1* | 5/2021 | Cao | H04W 72/0453 |
| 2022/0030575 A1* | 1/2022 | Farag | H04L 5/0053 |
| 2022/0217682 A1* | 7/2022 | Peng | H04W 72/044 |
| 2022/0225292 A1* | 7/2022 | Mohammad Soleymani | H04W 72/20 |
| 2022/0247539 A1* | 8/2022 | Luo | H04L 1/1854 |
| 2022/0338186 A1* | 10/2022 | Hui | H04W 72/20 |
| 2022/0377724 A1* | 11/2022 | Yoshioka | H04L 5/0048 |
| 2023/0026229 A1* | 1/2023 | Hui | H04L 1/1864 |
| 2023/0106109 A1* | 4/2023 | Zhang | H04W 72/25 370/336 |

(Continued)

FOREIGN PATENT DOCUMENTS

KR       3 955 660 A1 *  2/2022  ............ H04W 64/00

*Primary Examiner* — Peter G Solinsky
*Assistant Examiner* — Sanjay K Dewan
(74) *Attorney, Agent, or Firm* — Arent Fox LLP /Qualcomm Incorporated

(57) ABSTRACT

Some aspects described herein relate transmitting, to a receiving UE, a sidelink control information (SCI) that schedules multiple transport blocks (TBs) of shared channel communications in multiple time divisions, and transmitting, to the receiving UE and based on the SCI, the multiple TBs of shared channel communications in the multiple time divisions. Other aspects relate to receiving, from a transmitting UE, a SCI that schedules multiple TBs of shared channel communications in multiple time divisions, and receiving, from the transmitting UE and based on the SCI, the multiple TBs of shared channel communications in the multiple time divisions. Additional aspects relate to configuring the UEs in this regard.

30 Claims, 9 Drawing Sheets

(56) References Cited

U.S. PATENT DOCUMENTS

2023/0109558 A1* 4/2023 Hui ................. H04W 72/20
370/329
2023/0199804 A1* 6/2023 Hwang ............. H04W 72/12
370/329

* cited by examiner

TECHNIQUES FOR SCHEDULING SIDELINK COMMUNICATIONS IN MULTIPLE TIME PERIODS

BACKGROUND

Aspects of the present disclosure relate generally to wireless communication systems, and more particularly, to scheduling sidelink communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, user equipment (UEs) communicate over one or more of multiple interfaces. The multiple interfaces may include a Uu interface between the UE and a base station, where the UE can receive communications from the base station over a downlink and transmit communications to the base station over an uplink. In addition, the multiple interfaces may include a sidelink interface to communicate with one or more other UEs directly over a sidelink channel (e.g., without traversing the base station).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication as a transmitting user equipment (UE) in sidelink communications is provided that includes a transceiver, a memory configured to store instructions, and one or more processors communicatively coupled with the memory and the transceiver. The one or more processors are configured to execute the instructions to cause the apparatus to transmit, to a receiving UE, a sidelink control information (SCI) that schedules multiple transport blocks (TBs) of shared channel communications in multiple time divisions, and transmit, to the receiving UE and based on the SCI, the multiple TBs of shared channel communications in the multiple time divisions.

In another aspect, an apparatus for wireless communication as a receiving UE in sidelink communications is provided that includes a transceiver, a memory configured to store instructions, and one or more processors communicatively coupled with the memory and the transceiver. The one or more processors are configured to execute the instructions to cause the apparatus to receive, from a transmitting UE, a SCI that schedules multiple TBs of shared channel communications in multiple time divisions, and receive, from the transmitting UE and based on the SCI, the multiple TBs of shared channel communications in the multiple time divisions In another aspect, a method for wireless communication by a transmitting UE in sidelink communications is provided that includes transmitting, to a receiving UE, a SCI that schedules multiple TBs of shared channel communications in multiple time divisions, and transmitting, to the receiving UE and based on the SCI, the multiple TBs of shared channel communications in the multiple time divisions.

In another aspect, a method for wireless communication by a receiving UE in sidelink communications is provided that includes receiving, from a transmitting UE, a SCI that schedules multiple TB) of shared channel communications in multiple time divisions, and receiving, from the transmitting UE and based on the SCI, the multiple TBs of shared channel communications in the multiple time divisions.

In another aspect, a method for wireless communication by a base station is provided that includes receiving, from a transmitting UE in sidelink communications, a request to schedule multiple TBs of shared channel transmissions using a single SCI, and transmitting, to the UE, a scheduling grant indicating resources for transmitting the multiple TBs of shared channel transmissions and the single SCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
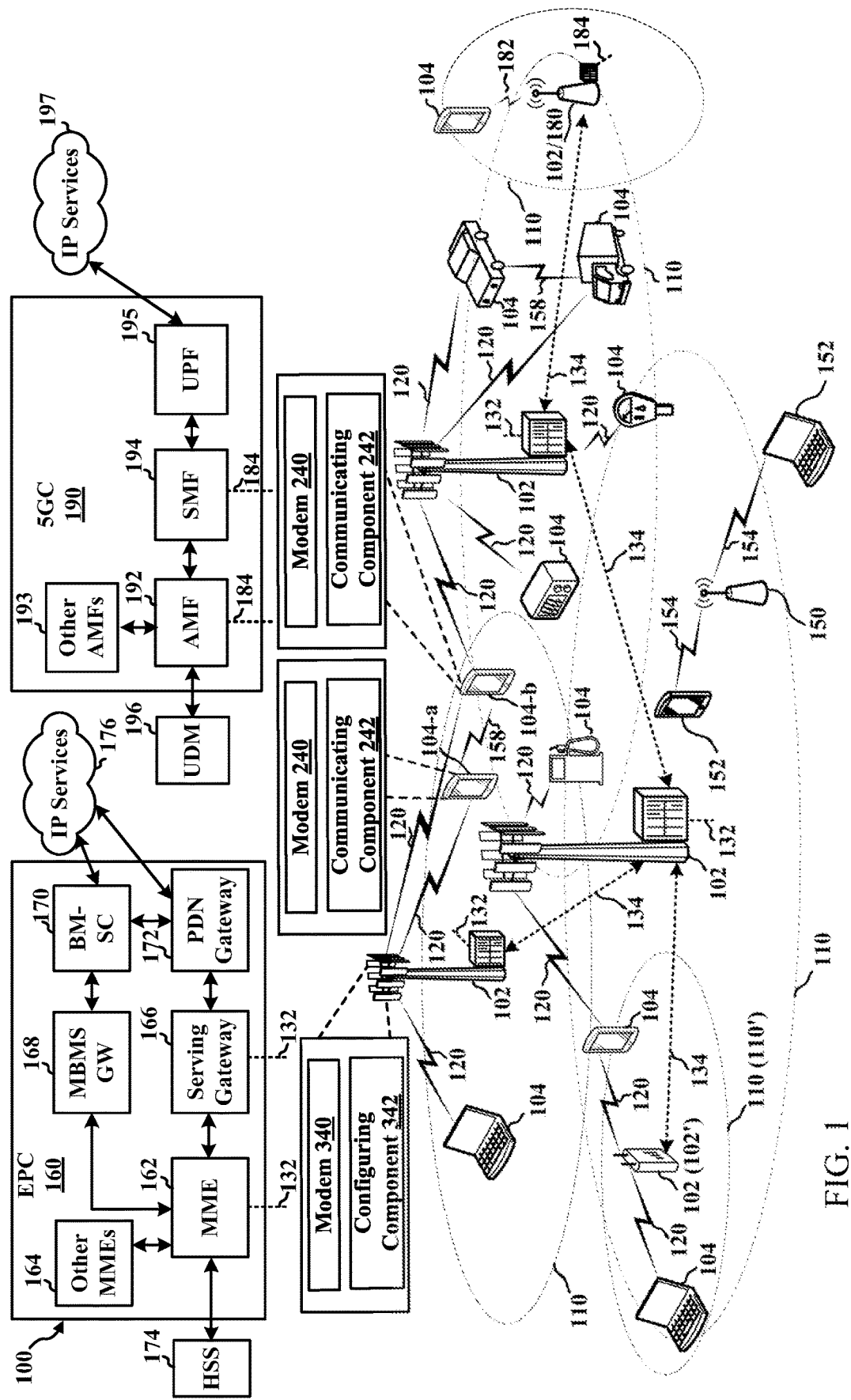
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to scheduling sidelink (SL) communications in multiple time periods or time divisions, such as multiple slots, mini-slots, etc. For example, SL communications can refer to device-to-device (D2D) communication among devices (e.g., user equipment (UEs)) in a wireless network. In a specific example, SL communications can be defined for vehicle-based communications, such as vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a SL channel.

For example, a slot can include a collection of multiple symbols, where the multiple symbols can be one of orthogonal frequency division multiplexing (OFDM) symbols, single carrier-frequency division multiplexing (SC-FDM) symbols, or other types of symbols. In an example, the number of symbols in a slot may vary based on a cyclic prefix (CP) length defined for the symbols. A mini-slot, in an example, can include a portion of a slot, and thus a slot can include multiple mini-slots. In one example, UE can transmit SL communications in the slot or mini-slot, where a transmission time interval (TTI) can be the slot, the mini-slot, or each symbol within the slot or mini-slot.

Continued support and implementation of SL communications is provided in fifth generation (5G) new radio (NR) communication technologies. 5G NR defines SL Mode 1, where a SL transmitting UE can receive a scheduling grant from a gNB that schedules the frequency and/or time resources for SL transmission by the SL transmitting UE (e.g., PSCCH and/or PSSCH resources). 5G NR also defines SL Mode 2, where a SL transmitting UE can select resources for SL transmission from a resource pool, where the resource pool may be configured by the gNB.

In aspects described herein, a SL transmitting UE can transmit, to one or more SL receiving UEs, SL control information (SCI) that schedules multiple sidelink transmissions by the SL transmitting UE. For example, the SL transmitting UE can transmit the SCI over a physical sidelink control channel (PSCCH) defined in a set of resources, which may include a set of frequency resources over a set of time resources, such as in a channel of multiple subcarriers over a slot, mini-slot, symbol, etc. The SCI can indicate other resources, including frequency and/or time resources, over which the SL transmitting UE transmits multiple shared channel communications, which can include transmitting data over a physical sidelink shared channel (PSSCH). In this regard, for example, a single SCI can indicate frequency and/or time resources over which multiple transport blocks (TBs) of PSSCH transmission are scheduled for transmitting by the SL transmitting UE. As described, for example, the frequency and/or time resources for the multiple TBs of PSSCH transmission can include a channel of multiple subcarriers over different slots, mini-slots, symbols, or other time divisions.

In some aspects, the SL transmitting UE can transmit SCI in a portion of resources of the PSSCH, such as in a first number of symbols in a first slot of a first PSSCH TB. In other aspects, the SCI can be decoupled from the PSSCH, such that the SL transmitting UE can transmit the SCI separately from the PSSCH. For example, the SL transmitting UE can transmit the SCI in different time resources (e.g., a different time division, such as a different slot, mini-slot, symbol, etc.) and/or in different frequency resources. In another example, where the SCI is decoupled from the PSSCH, the SL transmitting UE can transmit the SCI and PSSCH using different transmit beams, can support cross carrier scheduling where the resource pools for SCI and PSSCH are in different carriers, etc. Moreover, in some aspects, the SCI can be a multiple-stage SCI, including a first stage (or portion) that indicates frequency and/or time resources associated with the PSSCHs, and a second stage (or portion) that indicates other control information associated with the PSSCHs.

In addition, for example, the SCI can indicate a number of time divisions reserved for retransmission, by the SL transmitting UE, of one or more of the multiple TBs, and/or for transmitting retransmission SCI that schedules the number of time divisions for retransmission. In another example, an SL feedback information (SLFI) codebook can be supported to allow SL receiving UEs to indicate multiple feedback bits for receiving the multiple TBs. This may include introducing a sidelink acknowledgement index (SAI) to allow the SL transmitting UE to interpret the feedback bits and possibly determine TBs for which feedback is missing or is otherwise not received or indicated by the SL receiving UE. In addition, mini-slot SCI can be supported where the SL transmitting UE can indicate a mini-slot and/or a subchannel of a channel over which the SL receiving UE is to transmit feedback, which may include hybrid automatic repeat/request (HARM) feedback bits, channel state information (CSI), etc. Aspects described above and further herein, in some examples, can be implemented for SL Mode 1 and/or SL Mode 2 configurations in 5G NR.

The aspects described herein can allow for scheduling multiple TBs of SL communications over multiple time divisions using a single SCI. This can mitigate overhead associated with otherwise scheduling each single TB using a single SCI. In addition, some SCI for multiple TBs can be combined as information common to the multiple TBs, which can further conserve SCI overhead. Conserving overhead associated with transmitting control information, in this regard, can conserve radio resource used to communicate the control information, improve communication throughput for SL devices, which can improve user experience, etc.

The described features will be presented in more detail below with reference to FIGS. 1-9.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for transmitting or receiving SCI scheduling multiple shared channel communications and/or transmitting or receiving the multiple shared channel communications, as described further herein. In addition, some nodes may have a modem 340 and configuring component 342 for configuring UEs with resources or resource pools for transmitting or receiving SCI scheduling multiple shared channel communications and/or transmitting or receiving the multiple shared channel communications, as described herein. Though UEs 104-a and 104-b is shown as having the modem 240 and communicating component 242 and a base station 102 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs (e.g., UE 104-a and 104-b) may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. In addition, in this regard, UEs 104-a, 104-b can use a portion of frequency in the 5 GHz unlicensed frequency spectrum in communicating with the small cell 102', with other cells, with one another using sidelink communications, etc. The UEs 104-a, 104-b, small cell 102', other cells, etc. can use other unlicensed frequency spectrums as well, such as a portion of frequency in the 60 GHz unlicensed frequency spectrum.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE 104-*a* can be a SL transmitting UE that can transmit SL communications to a receiving UE 104-*b*. In this example, the SL transmitting UE 104-*a* can transmit, to the SL receiving UE 104-*b*, SCI to schedule resources over which the SL transmitting UE 104-*a* transmits SL communications to the SL receiving UE 104-*b* (e.g., PSSCH communications). In addition, the SL transmitting UE 104-*a* can transmit SCI that schedules resources over which the SL receiving UE 104-*b* can transmit communications (e.g., back to the SL transmitting UE 104-*a*, to other UEs, etc.), such as feedback communications (which may include HARQ feedback, CSI, etc.), other PSSCH communications, etc. According to aspects described herein, the SL transmitting UE 104-*a* can transmit SCI that schedules multiple TBs of shared channel communications in multiple time divisions (e.g., multiple slots, mini-slots, etc.). In one example, a base station 102 can configure the SL transmitting UE 104-*a* with resources for transmitting the SCI and the corresponding multiple TBs of shared channel communications.

In an example, the SL receiving UE 104-*b* can receive the SCI and process the SCI to determine resources over which to receive the shared channel communications from the SL transmitting UE 104-*a*. The SCI can be a multiple-stage SCI, as described, which can indicate resource allocation (e.g., in frequency and/or time) in a first stage, common control information in a second stage, etc. In another example, the SCI can also resources reserved for retransmitting one or more of the multiple TBs. In this example, the SL receiving UE 104-*b* can determine, from the SCI, the retransmission resources and attempt to receive retransmissions of the one or more TBs over the resources. In another example, the SCI can additionally indicate feedback resources over which the SL receiving UE 104-*b* is to transmit feedback for the multiple TBs. In this example, the SL receiving UE 104-*b* can determine, from the SCI, feedback resources over which to transmit feedback for the multiple TBs to the SL transmitting UE 104-*a*.

Figure 2:
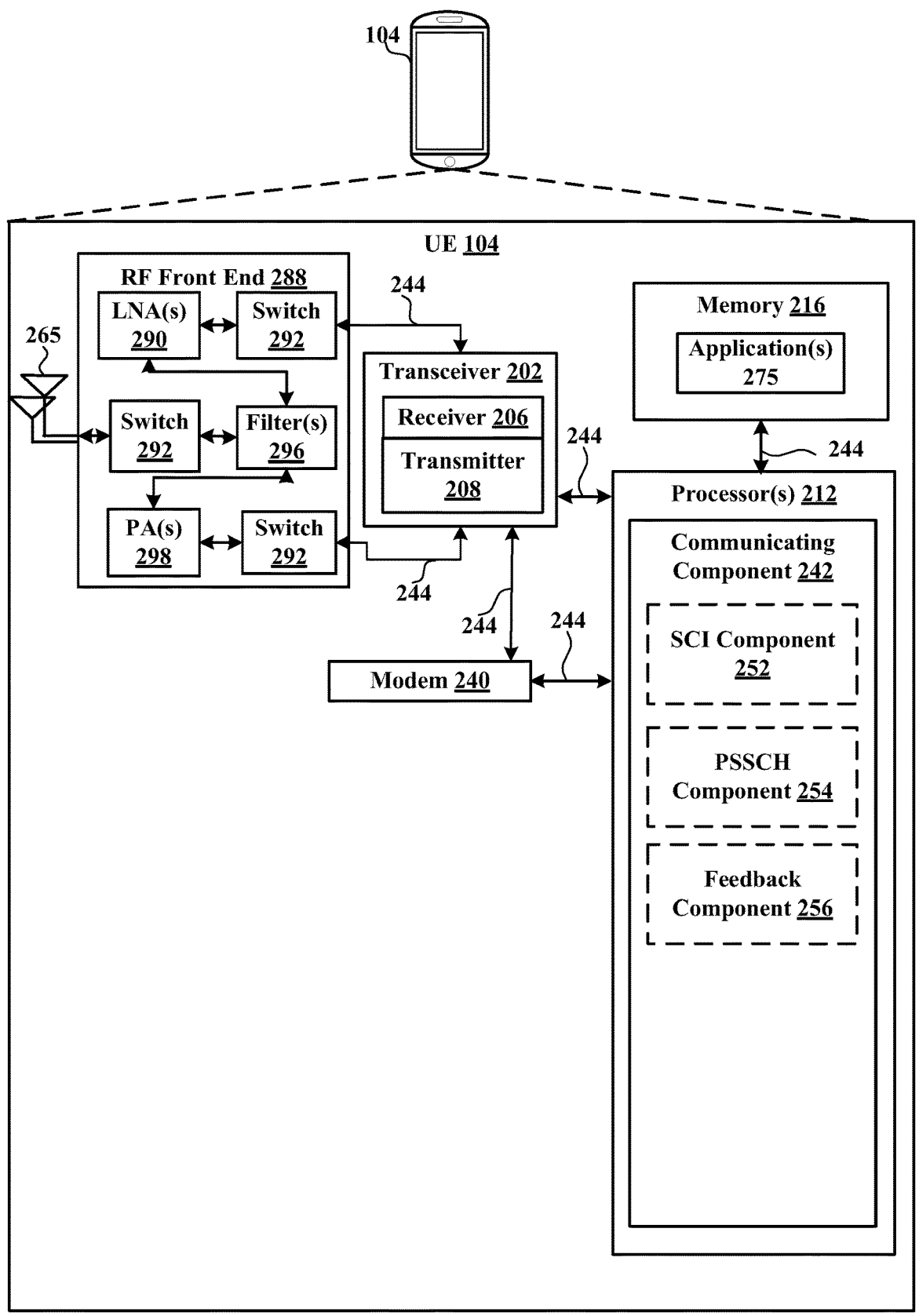
FIG. 2 is a block diagram illustrating an example of a user equipment (UE), in accordance with various aspects of the present disclosure.
Figure 3:
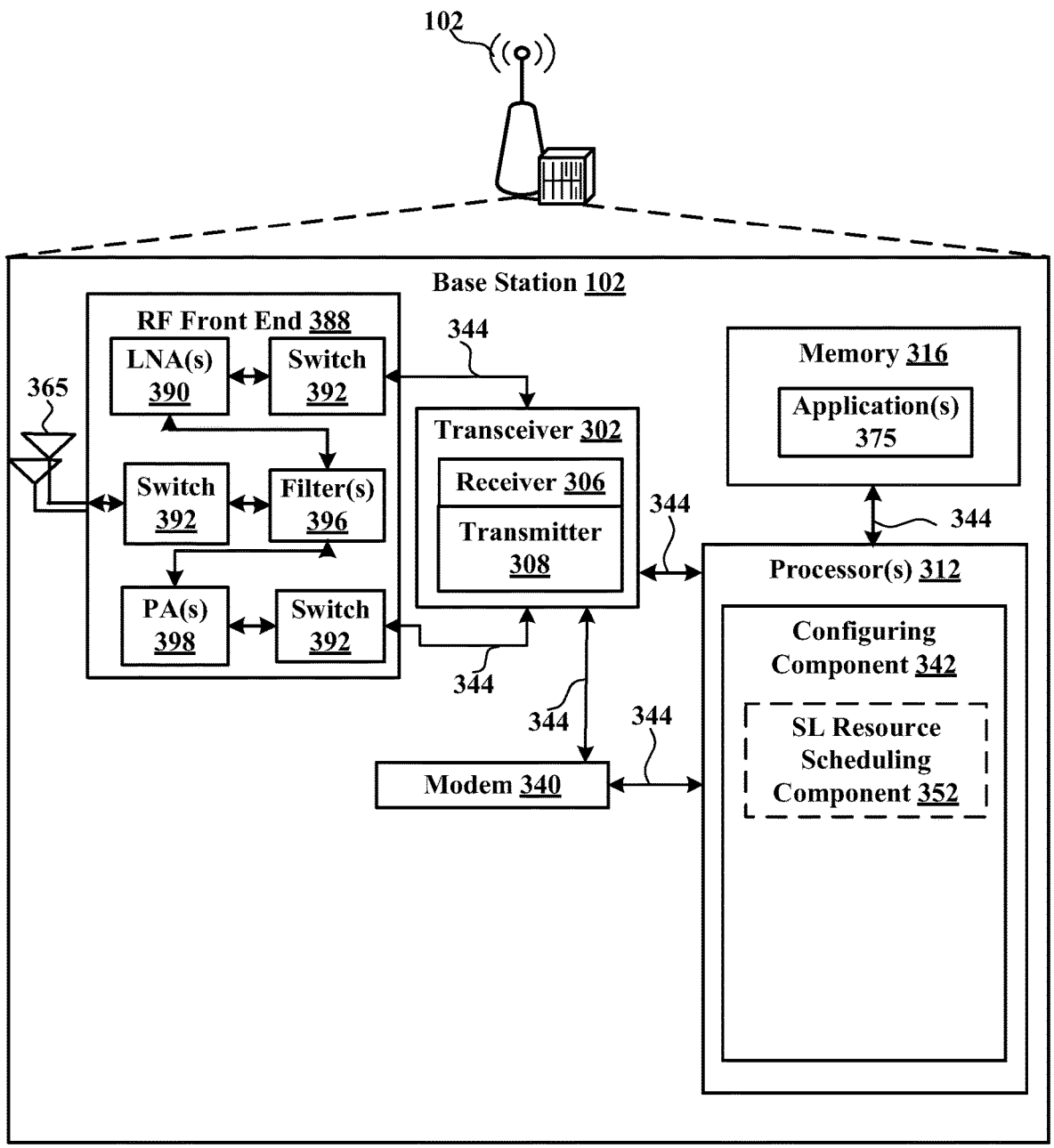
FIG. 3 is a block diagram illustrating an example of a base station, in accordance with various aspects of the present disclosure.
Figure 4:
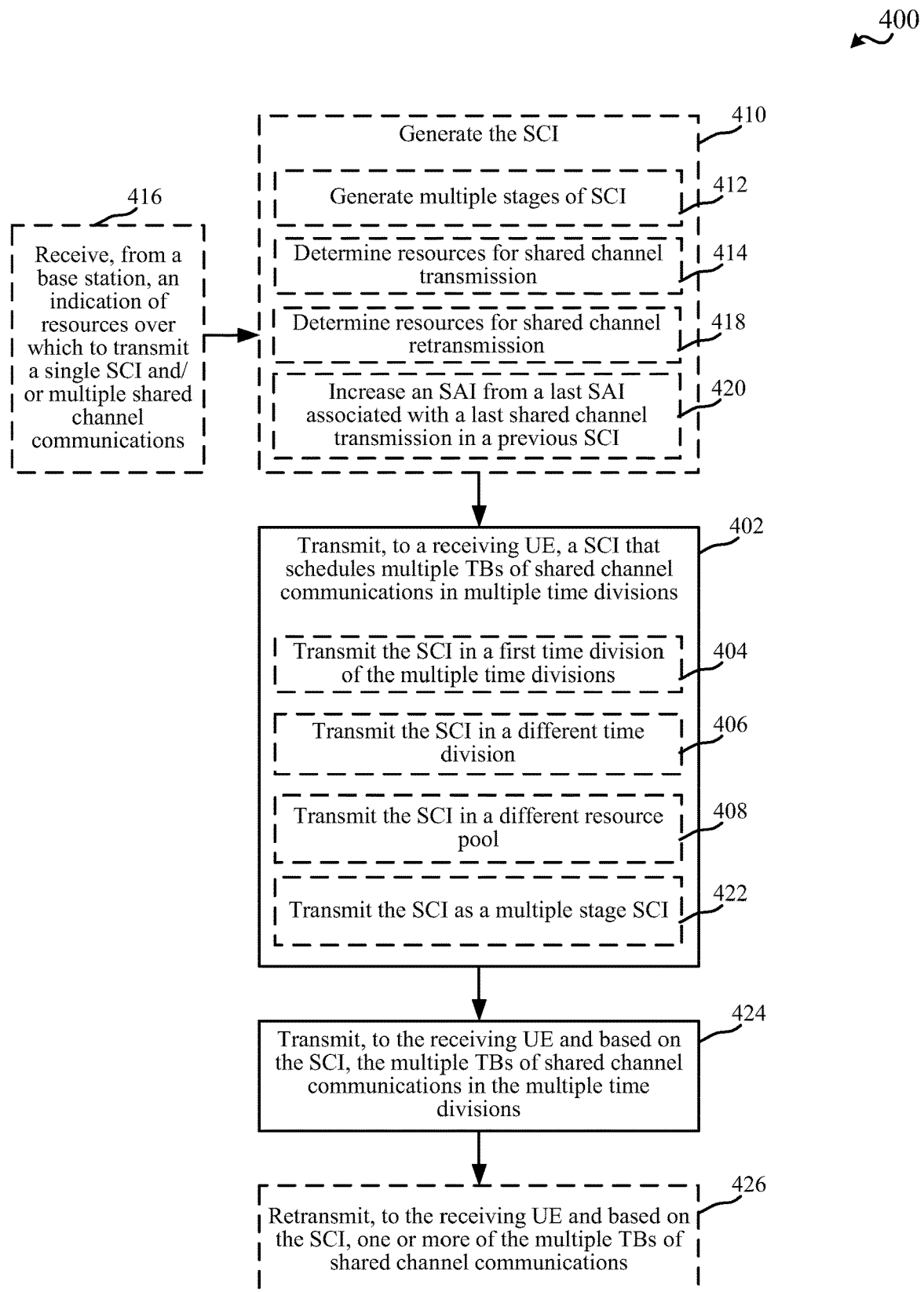
FIG. 4 is a flow chart illustrating an example of a method for transmitting a single sidelink control information (SCI) to schedule multiple TBs of shared channel communications, in accordance with various aspects of the present disclosure.
Figure 5:
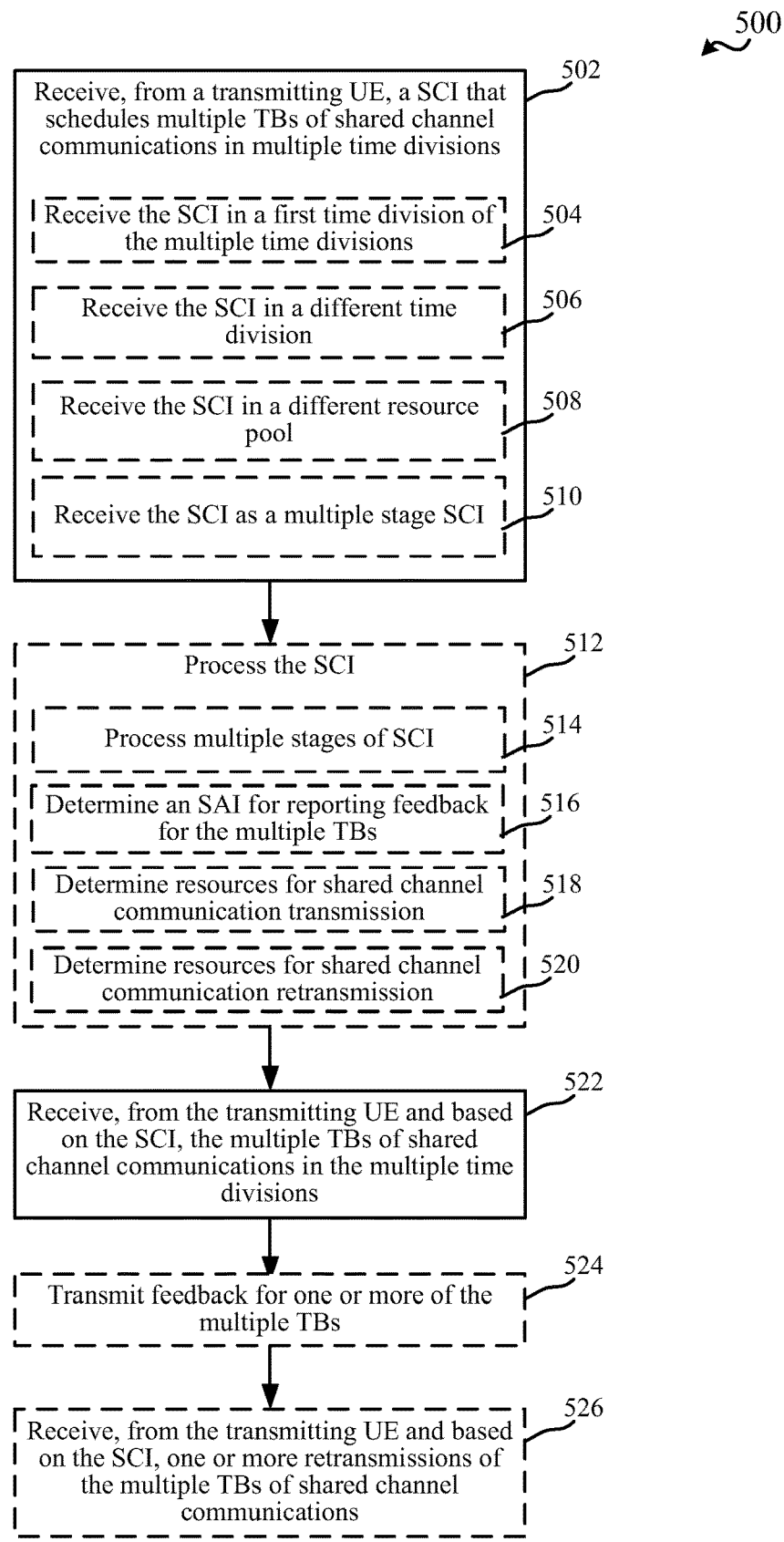
FIG. 5 is a flow chart illustrating an example of a method for receiving a single SCI scheduling multiple TBs of shared channel communications, in accordance with various aspects of the present disclosure.
Figure 6:
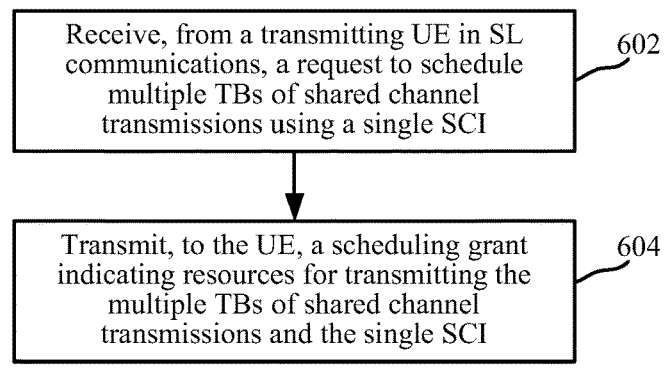
FIG. 6 is a flow chart illustrating an example of a method for scheduling resources for a single SCI scheduling multiple TBs of shared channel communications, in accordance with various aspects of the present disclosure.

Turning now to FIGS. 2-9, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting or receiving SCI scheduling multiple shared channel communications and/or transmitting or receiving the multiple shared channel communications, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102 or a SL transmitting UE. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, receiving wireless communications transmitted by at least one base station 102 or a SL transmitting UE, transmitting wireless communications to at least one base station 102 or a SL receiving UE, etc. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102, one or more other UEs in SL communications, etc. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a SCI component 252 for generating and transmitting SCI by a SL transmitting UE, or receiving and processing SCI by a SL receiving UE, a PSSCH component 254 for generating and transmitting PSSCH, or other scheduled communications, by a SL transmitting UE, or receiving and processing PSSCH, or other scheduled communications, by a SL receiving UE, and/or a feedback component 256 for transmitting, by a SL receiving UE, feedback for PSSCHs, or receiving and processing, by a SL transmitting UE, feedback received for PSSCHs, as described herein.

In an aspect, the processor(s) 212 may correspond to one or more of the processors described in connection with the UE in FIG. 15. Similarly, the memory 216 may correspond to the memory described in connection with the UE in FIG. 15.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring UEs with resources or resource pools for transmitting or receiving SCI scheduling multiple shared channel communications and/or transmitting or receiving the multiple shared channel communications, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a SL resource scheduling component 352 for scheduling a SL transmitting UE with resources (e.g., in SL Mode 1), or a resource pool (e.g., in SL Mode 2), for transmitting a single SCI to schedule multiple shared channel communications, as described herein.

In an aspect, the processor(s) 312 may correspond to one or more of the processors described in connection with the base station in FIG. 15. Similarly, the memory 316 may correspond to the memory described in connection with the base station in FIG. 15.

FIG. 4 illustrates a flow chart of an example of a method 400 for transmitting a single SCI to schedule multiple TBs of shared channel communications. In an example, a UE (e.g., UE 104-a, as a SL transmitting UE in sidelink communications) can perform the functions described in method 400 using one or more of the components described in FIGS. 1 and 2.

In method 400, at Block 402 (e.g., for SL transmitting UE 104-a), a SCI that schedules multiple TBs of shared channel communications in multiple time divisions can be transmitted to a receiving UE (e.g., a SL receiving UE 104-b). In an aspect, SCI component 252, e.g., in conjunction with processor(s) 212, memory 216, transceiver 202, communicating component 242, etc., can transmit, to the receiving UE, the SCI that schedules multiple TBs of shared channel communications in multiple time divisions. As described, the multiple time divisions may include multiple slots, multiple mini-slots in one or more slots, etc. For example, SCI component 252 can transmit the SCI over control resources (e.g., resources allocated for PSCCH communications). In an example, SCI component 252 can determine the control resources based on a resource grant received from a base station (e.g., in SL Mode 1), based on a resource pool configured by the base station for PSCCH (e.g., in SL Mode 2), etc., and can transmit the single SCI over the control resources.

In one example, as described, the control resources may be embedded in the shared channel communication resources, such as in a first number of symbols of a first time division of the shared channel communication resources. In addition, for example, the control resources may be in a same or different frequency (or portion of frequency) than the shared channel communication resources. For example, the control resources may be in a subchannel of a channel occupied by the shared channel communication resources. An example is shown in FIG. 7.

Figure 7:
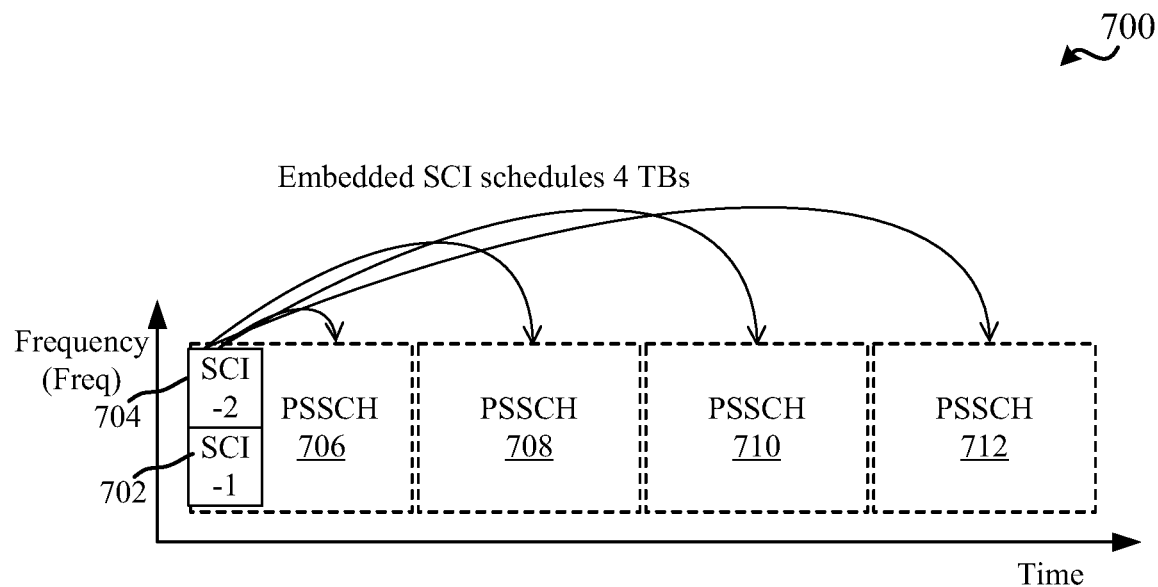
FIG. 7 is an example of a resource allocation for transmitting a single SCI embedded with one of multiple shared channel transmissions, in accordance with various aspects of the present disclosure.

FIG. 7 depicts an example of a resource allocation 700 for transmitting a single SCI and multiple PSSCHs. In resource allocation 700, SCI can be transmitted as a two-stage SCI including SCI-1 702 and SCI-2 704, which are transmitted in the same time division (e.g., slot, mini-slot, or portion thereof) at different frequency subchannels. In this example, the SCI is embedded within resources used for PSSCH communications which the SCI schedules. For example, SCI-1 702 and SCI-2 704 can be transmitted in a first portion of a first slot or mini-slot of multiple slots or mini-slots scheduled for transmitting PSSCHs 706, 708, 710, 712. SCI-1 702 can indicate frequency and/or time resource allocation of the PSSCHs 706, 708, 710, 712, and/or other information for each PSSCH 706, 708, 710, 712. SCI-2 704 can indicate other control information for the PSSCHs 706, 708 710, 712. In an example, the SCI can include a multi-transmission time interval (TTI) grant for PSCCH/PSSCH in continuous slots within a transmission resource pool, which may be allocated by or identified by a base station. In the embedded SCI, SCI-1 702 and SCI-2 704 can be co-located in the first PSSCH 706 slot or mini-slot, and the remaining PSSCH 708, 710, 712, slot or mini-slot may not include SCI.

In another example, as described the control resources may be decoupled from the shared channel communication resources. As such, for example, the control resources may be in a different time division than the shared channel communication resources (e.g., in a different slot or mini-slot, etc.). In addition, for example, the control resources may be in a different frequency than the shared channel communication resources (e.g., in a different channel or in a different subchannel). An example is shown in FIG. 8.

Figure 8:
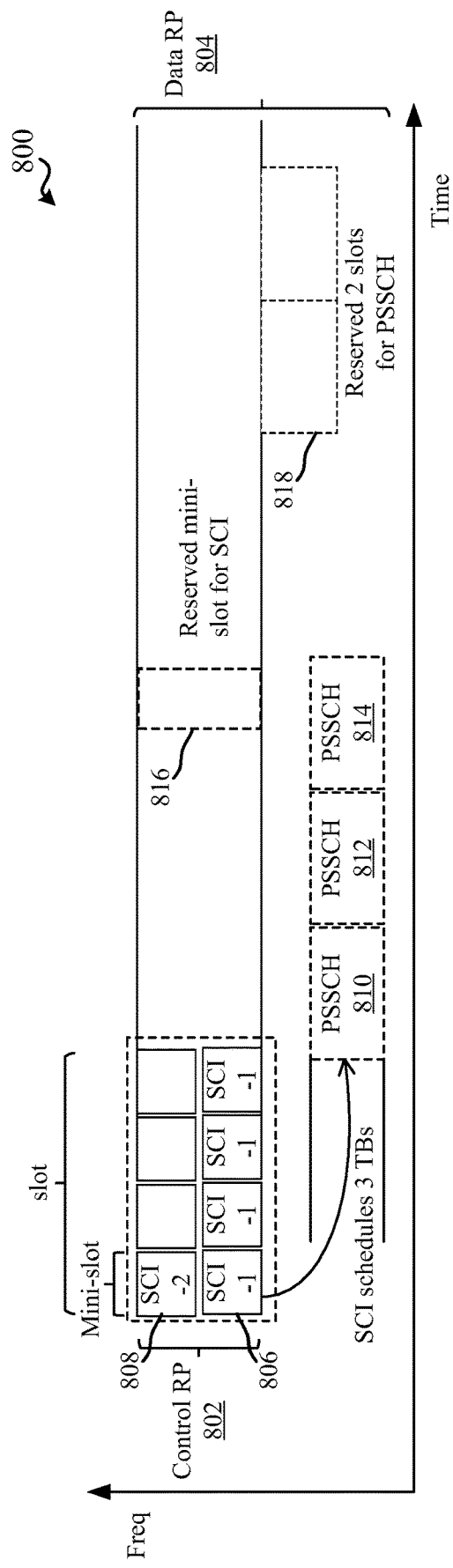
FIG. 8 illustrates an example of a resource allocation for transmitting a single SCI decoupled from multiple shared channel transmissions, in accordance with various aspects of the present disclosure.

FIG. 8 depicts an example of a resource allocation 800 for transmitting a single SCI and multiple PSSCHs. In resource allocation 800, a control resource pool (RP) 802 can be allocated within a data RP 804 in frequency, though in other examples, the control RP 802 may be outside of the data RP 804 or may partially overlap the data RP 804. In this example, an RP may refer to resources that are generally used for control or data transmissions, which may be resources selected in scheduling the UE in SL Mode 1 or RPs configured for the UE for selecting resources in SL Mode 2. In resource allocation 800, SCI can be transmitted within the control RP 802 as a two-stage SCI including SCI-1 806 and SCI-2 808, which are transmitted in the same time division (e.g., mini-slot) at different frequency subchannels. In this example, the SCI is decoupled from resources used for PSSCH communications which the SCI schedules. For example, SCI-1 802 and SCI-2 804 can be transmitted along with multiple other SCIs in the control RP 802. In one example, each of the multiple SCI-1 in the control RP 802 may include the same SCI-2 that includes parameters common for all of the frequency and/or time resources of PSSCH indicated by the multiple SCI-1s in the control RP 802. In an example, SCI-1 806 can schedule multiple TBs for transmitting multiple PSSCHs 810, 812, 814. SCI-1 806 can indicate frequency and/or time resource allocation, or other information, for each of the PSSCHs 810, 812, 814, and SCI-2 808 can indicate other control information for the PSSCHs 810, 812, 814, as described further herein.

In an example, the SCI (e.g., SCI-1 806) can indicate time resources (e.g., as one or more time divisions (e.g., slot, min-slot, etc.)) reserved for indicating a retransmission SCI 816 for retransmission resources for retransmitting one or more of PSSCHs 810, 812, 814, which is shown as two slots 818 reserved for retransmission of PSSCH. In another example, SCI (e.g., SCI-1 806) can indicate the frequency and/or time resources corresponding to the two slots 818 reserved for retransmission of PSSCH. For example, the two slots 818 reserved for retransmitting can be less than the number of PSSCHs 810, 812, 814 that are possibly retransmitted. In the decoupled example, SCI-1 806 and SCI-2 808 can be located in a different slot or mini-slot than the scheduled PSSCHs 810, 812, 814.

In this regard for example, in transmitting the single SCI at Block 402, optionally at Block 404, the SCI can be transmitted in a first time division of the multiple time divisions. In an aspect, SCI component 252, e.g., in conjunction with processor(s) 212, memory 216, transceiver 202, communicating component 242, etc., can transmit the SCI in the first time division of the multiple time divisions. For example, as explained with reference to FIG. 7, SCI component 252 can transmit the SCI as embedded within the shared control channel communication resources, and thus may transmit the SCI in the first time division and/or in at least a portion of the frequency or channel allocated for shared channel communications (e.g., as occupying the entire channel or a subchannel thereof).

In another example, in transmitting the single SCI at Block 402, optionally at Block 406, the SCI can be transmitted in a different time division. In an aspect, SCI component 252, e.g., in conjunction with processor(s) 212, memory 216, transceiver 202, communicating component 242, etc., can transmit the SCI in a different time division than the multiple time divisions for the multiple TBs of the shared channel communications. For example, as explained with reference to FIG. 8, SCI component 252 can transmit the SCI as decoupled from the shared control channel communication resources, and thus may transmit the SCI in the different time division and/or in a different frequency or channel than the shared channel communications, in a portion of the frequency or channel allocated for shared channel communications, and/or the like.

In another example, in transmitting the single SCI at Block 402, optionally at Block 408, the SCI can be transmitted in a different resource pool. In an aspect, SCI component 252, e.g., in conjunction with processor(s) 212, memory 216, transceiver 202, communicating component 242, etc., can transmit the SCI in a different resource pool than a resource pool configured for the shared channel communications. For example, as described, the base station can configure multiple resource pools for SL communications, where one resource pool can be configured as a control resource pool (e.g., for SCI or other PSCCH communications) and another resource pool can be configured as a data resource pool (e.g., for corresponding PSSCH communications). Thus, for example, SCI component 252 can transmit the SCI over resources in the control resource pool, and can transmit corresponding multiple TBs of PSSCH in the data resource pool.

In method 400, optionally at Block 410 (e.g., for SL transmitting UE 104-*a*), the SCI can be generated. In an aspect, SCI component 252, e.g., in conjunction with processor(s) 212, memory 216, transceiver 202, communicating component 242, etc., can generate the SCI. As described above, SCI component 252 can generate the SCI as a single SCI that schedules multiple TBs of shared channel communications. In addition, for example, SCI component 252 can determine parameters for generating the SCI based on resources granted by the base station for the UE 104 to use in transmitting the SCI and/or corresponding PSSCH communications, as described further herein.

In an example, in generating the SCI at Block 410, optionally at Block 412, multiple stages of SCI can be generated. In an aspect, SCI component 252, e.g., in conjunction with processor(s) 212, memory 216, transceiver 202, communicating component 242, etc., can generate the multiple stages of SCI. For example, as described, SCI component 252 can generate a first stage of SCI (SCI-1) to include frequency and/or time resource information (e.g., frequency domain resource allocation (FDRA) and/or time domain resource allocation (TDRA)) for the multiple TBs of PSSCH communications. In one example, SCI component 252 can include, in the first stage of SCI that schedules the multiple PSSCH communications, a new time resource allocation field (e.g., K0, which indicates a starting index of a starting time division of the PSSCH, and the number of contiguous time divisions for the PSSCH communications). In one example, the SCI may include a PSSCH TDRA that indicates time domain resources for multiple PSCCH/PSSCH in a transmission resource pool. In another example, a new TDRA table can be defined across several continuous time divisions in the transmission resource pool. Moreover, in an example, K0 may not be needed or used for embedded SCI, as the SCI in this example may be in the same time division as the first TB of the multiple TBs, as described above.

In an example, SCI component 252 can generate the first stage of SCI (SCI-1) to additionally include a common FDRA field that can indicate a starting data subchannel and the number of subchannels for all of the PSSCHs, in frequency. In an example, the PSSCHs can be scheduled over the same collection of one or more subchannels. In one example, for embedded SCI, an indication of the starting data subchannel may not be needed or used, as the starting data subchannel can be the same as, or indicated by, the SCI-1, and the FDRA field in SCI-1a can indicate the number (e.g., count) of scheduled subchannels, which may be consecutive in frequency. In another example, for decoupled SCI, a new PSSCH scheduling FDRA field can be used that indicates the starting subchannel. In an example, for decoupled SCI, the FDRA field in SCI-1a may be reused to indicate the number (e.g., count) of scheduled subchannels. In another example, SCI component 252 can generate the first stage of SCI (SCI-1) to additionally indicate a common DMRS pattern for all of the PSSCH communications, a common MCS for all of the TBs carting the PSSCH communications, common priority class, etc.

In an example, in generating the SCI at Block 410, optionally at Block 414, resources for shared channel transmission can be determined. In an aspect, SCI component 252, e.g., in conjunction with processor(s) 212, memory 216, transceiver 202, communicating component 242, etc., can determine the resources for shared channel transmission. As described, for example, SCI component 252 can determine the resources for transmission of multiple PSSCH TBs to be indicated in the single SCI. In one example, the base station can allocate the resources for transmission of multiple PSSCH TBs, whether in SL Mode 1 where the SL transmitting UE can request resource allocation or in SL Mode 2 where the base station can allocate a resource pool from which the SL transmitting UE can select resources for the shared channel transmissions. SCI component 252 can generate the SCI to indicate the resources for shared channel transmission (e.g., as including a TDRA, FDRA, etc., as described above).

In method 400, optionally at Block 416, an indication of resources over which to transmit a single SCI and/or multiple shared channel communications can be received from a base station. In an aspect, SCI component 252, e.g., in conjunction with processor(s) 212, memory 216, transceiver 202, communicating component 242, etc., can receive, from the base station, the indication of resources over which to transmit the single SCI and/or multiple shared channel communications. For example, SCI component 252 can request scheduling of the resources for the single SCI and/or the multiple PSSCHs from the base station. In an example, SCI component 252 can transmit, to the base station, a buffer status report (BSR) or other notification that the UE has SL data to transmit. The base station can accordingly grant resources to the UE for transmitting SL data and related control data. SCI component 252, in an example, can determine the resources for shared channel communications, and for transmitting the single SCI, based on the resources granted by the base station 102. In other examples, as described, the indication of resources received from the base station can include one or more resource pools (e.g., a control RP and/or data RP) from which SCI component 252 can select resources for transmitting the SCI and/or resources for transmitting the corresponding PSSCHs, which can be indicated in the SCI, as described above.

In an example, in generating the SCI at Block 410, optionally at Block 418, resources for shared channel retransmission can be determined. In an aspect, SCI component 252, e.g., in conjunction with processor(s) 212, memory 216, transceiver 202, communicating component 242, etc., can determine resources for shared channel retransmission. For example, SCI component 252 can select the resources for shared channel retransmission from the resources indicated by the base station for shared channel transmission. In another example, the base station can indicate the resources for shared channel retransmission in resource allocation to the UE, and SCI component 252 can accordingly determine the resources for shared channel retransmission based on the indication. In any case, SCI component 252 can generate the SCI to indicate the resources for possibly retransmitting the shared channel communications (e.g., as including a TDRA, FDRA, etc., as described above). In another example, SCI component 252 can generate the SCI to indicate resources for possibly transmitting another SCI that schedules the retransmission resources.

In an example, a multi-TTI SCI-1 that schedules multiple TTIs or TBs for PSSCH can also reserve future resources for multiple TB retransmissions. Not all TBs may need retransmission. In one specific example, legacy SCI-1a TDRA field, as currently defined in 5G NR for SCI, can be used to reserve up to two future slots (e.g., slots or mini-slots) within the next 32 slots. In this or other examples, a higher layer may configure the number of contiguous slots for retransmission. Thus, for example, SCI component 252 can transmit, via radio resource control (RRC) signaling, an indication of a number of time divisions (e.g., slots, mini-slots, etc.) for retransmission. The number of contiguous slots for retransmission may be smaller than the number of TBs at the initial transmission as only a small percentage of TBs may need retransmission. In an example, SCI-1a TDRA can indicate the starting slot of the future reserved burst for retransmissions. The indication of the future reservation starting slot can be indicated as an offset (e.g., in number of time divisions) from the first scheduled PSSCH for initial transmission. As described, for example, for decoupled SCI, SCI-1 may include a new mini-slot TDRA field that can reserve future mini-slots for SCI which schedules the retransmission. The new mini-slot TDRA field, for example, may reserve up to two future mini-slots in the control RP. In addition, for example, SCI component 252 can generate the SCI to reuse SCI-1a FDRA field, defined in 5G NR for SCI, to indicate a common occupied subchannel for up to 2 future reserved bursts of slots for multi-TB retransmission. The slots in a reserved burst can share the common FDRA.

In addition, for example, SCI component 252 can generate the two-stage SCI to include SCI-2, as described above. A Multi-TTI SCI-2 grant can correspond to multiple scheduled PSSCH transmissions, and can include one or more related parameters. The parameters in SCI-2 may include, for example, an explicit HARQ identifier indication for transmitting HARQ feedback for the first TB of the multiple TBs. In this example, the receiver SL UE can assume incremental HARQ identifiers for the later associated PSSCHs. In one example, SCI-2 can indicate the first HARQ ID associated with the first slot in the burst, and then the HARQ process identifier can be incremented by 1 for subsequent slots in the scheduled order (e.g., with modulo operation as needed). In another example, SCI component 252 can generate SCI-2 to include multiple new data indicator (NDI) bits (e.g., one bit per PSSCH), such that each PSSCH can have a corresponding bit to indicate whether the PSSCH is a new transmission or retransmission. In addition, in an example, SCI component 252 can generate SCI-2 to indicate multiple redundancy version (RV) bits, such that each PSSCH may have a corresponding bit to indicate RV. In another example, SCI component 252 can generate SCI-2 to indicate a single TCI state of all PSSCHs, a same destination ID as all the TBs are for a single SL receiving UE, etc.

Moreover, in an example, feedback component 256 can generate SCI-2 to indicate resources for transmitting feedback, such as HARQ feedback. For example, as defined in 5G NR, HARQ acknowledgement (ACK)/negative-ACK (HACK) via physical sidelink feedback channel (PSFCH) can have a fixed timeline, so K1, physical resource indicator (PRI), etc. may not be needed in SCI-2 for legacy SL communications. To save HARQ ACK/NACK overhead, the SCI can be generated to include HARQ ACK/NACK bits for the scheduled TB feedback to the SL transmitting UE with the same HARQ codebook via multi-bit ACK/NACK carrying channel. In this example, SCI component 252 can generate the SCI to include K1 and PM for the HARQ codebook. For example, SCI component 252 can generate a multi-TTI SCI-2 grant that indicates K1, PRI and SAI to support multi-bit HARQ codebook, where K1 can be a value that is based on, or an offset of, the last PSSCH, and PRI can indicate the SLFI resource index. The SL transmitting UE may configure, for each SL receiving UE and PRI, a subset of SLFI resource indices to indicate the resource index within the preconfigured set. For a type-2 codebook, the SAI field can be introduced for a SL receiving UE to detect missing SCI-2 so the SL receiving UE can perform necessary padding on the HARQ codebook, as described further herein.

In this regard, for example, generating the SCI at Block 410 can optionally include, at Block 420, increasing an SAI from a least SAI associated with a last shared channel transmission in a previous SCI. In an aspect, SCI component 252, e.g., in conjunction with processor(s) 212, memory 216, transceiver 202, communicating component 242, etc., can increase the SAI from the last SAI associated with the last shared channel transmission in the previous SAI. For example, SCI component 252 can determine the SAI indicated for the last shared channel transmission in a previous burst, and can increase the SAI (e.g., by incrementing the SAI) for the current burst of multiple TBs.

In transmitting the single SCI at Block 402, optionally at Block 422, the SCI can be transmitted as a multiple stage SCI. In an aspect, SCI component 252, e.g., in conjunction with processor(s) 212, memory 216, transceiver 202, communicating component 242, etc., can transmit the SCI as the multiple stage SCI, e.g., such as a two-stage SCI. As explained above, in some examples, SCI component 252 can transmit each of the multiple stages in different resources, such as in different frequency resources (e.g., different subchannels) in the same time division. In other examples, SCI component 252 can transmit each of the multiple stages in different time divisions (e.g., in the same or different or overlapping frequency resources, etc.).

In method 400, at Block 424 (e.g., for SL transmitting UE 104-a), the multiple TBs of shared channel communications can be transmitted, to a receiving UE (e.g., a SL receiving UE 104-b) and based on the SCI, in the multiple time divisions. In an aspect, PSSCH component 254, e.g., in conjunction with processor(s) 212, memory 216, transceiver 202, communicating component 242, etc., can transmit, to the receiving UE and based on the SCI, the multiple TBs of the shared channel communications in the multiple time divisions (e.g., slots, mini-slots, etc.). For example, the multiple TBs of the shared channel communications (e.g., PSSCHs) can be over resources that are in the same or overlapping frequency (e.g., same channel or subchannel) over different time divisions, where the time divisions may or may not be consecutive.

In method 400, optionally at Block 426 (e.g., for SL transmitting UE 104-a), one or more of the multiple TBs of shared channel communications can be retransmitted, to the receiving UE (e.g., a SL receiving UE 104-b) and based on the SCI. In an aspect, PSSCH component 254, e.g., in conjunction with processor(s) 212, memory 216, transceiver 202, communicating component 242, etc., can retransmit, to the receiving UE and based on the SCI, the one or more of the multiple TBs of shared channel communications. For example, PSSCH component 254 may retransmit the one or more of the multiple TBs based on feedback received from the SL receiving UE (e.g., over resources indicated by the SCI as feedback resources, as described above).

FIG. 5 illustrates a flow chart of an example of a method 500 for receiving a single SCI scheduling multiple TBs of shared channel communications. In an example, a UE (e.g., UE 104-b, as a SL receiving UE in sidelink communications) can perform the functions described in method 500 using one or more of the components described in FIGS. 1 and 2.

In method 500, at Block 502 (e.g., for SL receiving UE 104-b), a SCI that schedules multiple TBs of shared channel communications in multiple time divisions can be received from a transmitting UE (e.g., a SL transmitting UE 104-a). In an aspect, SCI component 252, e.g., in conjunction with processor(s) 212, memory 216, transceiver 202, communicating component 242, etc., can receive, from the transmitting UE, the SCI that schedules multiple TBs of shared channel communications in multiple time divisions. As described, the multiple time divisions may include multiple slots, multiple mini-slots in one or more slots, etc. For example, SCI component 252 can receive the SCI over control resources (e.g., resources allocated for PSCCH communications). In an example, SCI component 252 can attempt to decode the SCI over resources determined as control resources.

In one example, as described, the control resources may be embedded in the resources determined to be shared channel communication resources, such as in a first number of symbols of a first time division of shared channel communication resources. In addition, for example, the control resources may be in a same or different frequency (or portion of frequency) than the shared channel communication resources. For example, the control resources may be in a subchannel of a channel occupied by the shared channel communication resources, as shown and described in FIG. 7.

In another example, as described the control resources may be decoupled from the shared channel communication resources. As such, for example, the control resources may be in a different time division than the shared channel communication resources (e.g., in a different slot or mini-slot, etc.). In addition, for example, the control resources may be in a different frequency than the shared channel communication resources (e.g., in a different channel or in a different subchannel), as shown and described in FIG. 8.

In this regard for example, in receiving the single SCI at Block 502, optionally at Block 504, the SCI can be received in a first time division of the multiple time divisions. In an aspect, SCI component 252, e.g., in conjunction with processor(s) 212, memory 216, transceiver 202, communicating component 242, etc., can receive the SCI in the first time division of the multiple time divisions, as explained with reference to FIG. 7 for example.

In another example, in receiving the single SCI at Block 502, optionally at Block 506, the SCI can be received in a different time division. In an aspect, SCI component 252, e.g., in conjunction with processor(s) 212, memory 216, transceiver 202, communicating component 242, etc., can receive the SCI in a different time division than the multiple time divisions for the multiple TBs of the shared channel communications, as explained with reference to FIG. 8 for example.

In another example, in receiving the single SCI at Block 502, optionally at Block 508, the SCI can be received in a different resource pool. In an aspect, SCI component 252, e.g., in conjunction with processor(s) 212, memory 216, transceiver 202, communicating component 242, etc., can receive the SCI in a different resource pool than a resource pool configured for the shared channel communications. For example, as described, the base station can configure multiple resource pools for SL communications, where one resource pool can be configured as a control resource pool (e.g., for SCI or other PSCCH communications) and another resource pool can be configured as a data resource pool (e.g., for corresponding PSSCH communications). Thus, for example, SCI component 252 can receive, from the SL transmitting UE, the SCI over resources in the control resource pool, and can receive corresponding multiple TBs of PSSCH in the data resource pool.

In receiving the single SCI at Block 502, optionally at Block 510, the SCI can be received as a multiple stage SCI. In an aspect, SCI component 252, e.g., in conjunction with processor(s) 212, memory 216, transceiver 202, communicating component 242, etc., can receive the SCI as the multiple stage SCI, e.g., such as a two-stage SCI. As explained above, in some examples, SCI component 252 can receive each of the multiple stages in different resources, such as in different frequency resources (e.g., different subchannels) in the same time division. In other examples, SCI component 252 can receive each of the multiple stages in different time divisions (e.g., in the same or different or overlapping frequency resources, etc.).

In method 500, optionally at Block 512 (e.g., for SL receiving UE 104-b), the SCI can be processed. In an aspect, SCI component 252, e.g., in conjunction with processor(s) 212, memory 216, transceiver 202, communicating component 242, etc., can process the SCI, as received from the SL transmitting UE. For example, SCI component 252 can process the SCI by decoding the SCI from the control resources, determining that the SCI is intended for the SL receiving UE 104-b (e.g., based on determining that the SCI is scrambled with a RNTI assigned to the SL receiving UE 104-b), etc. As described above, as part of processing the SCI, SCI component 252 can determine that the SCI schedules multiple TBs of shared channel communications.

In an example, in processing the SCI at Block 512, optionally at Block 514, multiple stages of SCI can be processed. In an aspect, SCI component 252, e.g., in conjunction with processor(s) 212, memory 216, transceiver 202, communicating component 242, etc., can process the multiple stages of SCI. For example, as described, SCI component 252 can process a first stage of SCI (SCI-1) to include frequency and/or time resource information, which may include an FDRA, TDRA, K0, etc., as described above, for the multiple TBs of PSSCH communications. As described, for example, FDRA, TDRA, K0, etc. may indicate different values where the SCI is embedded or decoupled. In another example, SCI component 252 can process the first stage of SCI (SCI-1) to additionally determine a common DMRS pattern for all of the PSSCH communications, a common MCS for all of the TBs carting the PSSCH communications, common priority class, etc.

In addition, for example, SCI component 252 can process a second stage (SCI-2) of the multiple stage SCI, as described above. As described, for example, SCI component 252 can determine, from SCI-2, an explicit HARQ identifier indication for transmitting HARQ feedback for at least the first TB of the multiple TBs, e.g., from which SCI component 252 can determine subsequent HARQ identifiers as increments of the explicit HARQ identifier. In another example, SCI component 252 can determine, from SCI-2, multiple NDI bits (e.g., one bit per PSSCH), such that each PSSCH can have a corresponding bit to indicate whether the PSSCH is a new transmission or retransmission. In addition, in an example, SCI component 252 can determine, from SCI-2, multiple RV bits, such that each PSSCH may have a corresponding bit to indicate RV. In another example, SCI component 252 can determine, from SCI-2, a single TCI state of all PSSCHs, a same destination ID as all the TBs are for a single SL receiving UE, etc.

Moreover, as described, feedback component 256 can generate SCI-2 to indicate resources for transmitting feedback, such as HARQ feedback. In an example, in processing the SCI at Block 512, optionally at Block 516, an SAI for reporting feedback for the multiple TBs can be determined. In an aspect, SCI component 252, e.g., in conjunction with processor(s) 212, memory 216, transceiver 202, communicating component 242, etc., can determine the SAI for reporting feedback for the multiple TBs. For example, as described, SCI component 252 can determine, from SCI, values for K1, PRI and SAI to support multi-bit HARQ codebook, where K1 can be a value that is based on, or an offset of, the last PSSCH, PM can indicate the SLFI resource index, and SAI can indicate a value that allows the SL receiving UE to detect missing SCI-2 so the SL receiving UE can perform necessary padding on the HARQ codebook.

For example, SCI component 252 can determine, based on the SAI value received in a current SCI and a previous SAI value received in a previous SAI, whether corresponding PSSCH transmissions were not received (and/or how many were not received). For example, SCI component 252 can determine this based on a difference between the SAI values. Where SCI component 252 determines that some PSSCH transmissions were not received, as described further herein, feedback component 256 can pad HARQ ACK/NACK feedback with zeros (e.g., NACKs) to indicate that the PSSCH transmissions were not received. In this example, the payload size for feedback is as expected by the SL transmitting UE, and can indicate PSSCHs not received by the SL receiving UE. Where the SCI schedules multiple TBs, for example, SCI-2 can indicate the SAI value for the first PSSCH and the following PSSCH may be determined as incremental SAI values, which may be based on predefined rules. For example, the SCI for multiple TBs may include no explicit SAI field for the later PSSCH, and SCI component 252 can derive the SAI values based on specified rules. In one example, SCI component 252 can determine the SAI value of the n-th PSSCH after the first scheduled PSSCH to be $SAI_{1st}+(n-1)$. In this example, the next SCI can increase the SAI based on the last SAI associated with the last PSSCH in the previous (multi-TTI) SCI grant.

In an example, in processing the SCI at Block 512, optionally at Block 518, resources for shared channel transmission can be determined. In an aspect, SCI component 252, e.g., in conjunction with processor(s) 212, memory 216, transceiver 202, communicating component 242, etc., can determine the resources for shared channel transmission. As described, for example, SCI component 252 can determine the resources for transmission of multiple PSSCH TBs as indicated in the single SCI, such as by the FDRA, TDRA, and/or other parameters in the SCI (e.g., in SCI-1). For example, SCI component 252 can determine the resources based on a PSSCH TDRA field, as defined in 5G NR, a newly defined TDRA table, a common FDRA field for the multiple TBs, etc., as described.

In an example, in processing the SCI at Block 512, optionally at Block 520, resources for shared channel retransmission can be determined. In an aspect, SCI component 252, e.g., in conjunction with processor(s) 212, memory 216, transceiver 202, communicating component 242, etc., can determine resources for shared channel retransmission. For example, SCI component 252 can determine, from the SCI, the resources for possibly receiving retransmissions of the shared channel communications (e.g., as including a TDRA, FDRA, etc., as described above). For example, SCI component 252 can determine the resources for possible retransmission based on a TDRA field defined in 5G NR SCI-1a that reserves up to two future bursts of slots for multi-TB retransmission, and/or a higher layer parameter configuring the number of contiguous slots for retransmission. For example, SCI component 252 can determine the resources for possible retransmission as offset from a last PSSCH scheduled in the SCI by an offset value indicated in the TDRA field in SCI-1a, or in a new field in SCI-1. In addition, for example, SCI component 252 can determine the resources based on a common FDRA field for the multiple TBs, as described.

In another example, SCI component 252 can determine the resources for possible retransmission based on detecting a retransmission SCI transmitted by the SL transmitting UE, where resources for the retransmission SCI can be indicated in the SCI. In this example, SCI component 252 can monitor the control resources for the retransmission SCI from the SL transmitting UE based on one or more related parameters in the SCI.

In method 500, at Block 522 (e.g., for SL receiving UE 104-b), the multiple TBs of shared channel communications can be received, from the transmitting UE (e.g., a SL transmitting UE 104-a) and based on the SCI, in the multiple time divisions. In an aspect, PSSCH component 254, e.g., in conjunction with processor(s) 212, memory 216, transceiver 202, communicating component 242, etc., can receive, from the transmitting UE and based on the SCI, the multiple TBs of the shared channel communications in the multiple time divisions (e.g., slots, mini-slots, etc.). For example, the multiple TBs of the shared channel communications (e.g., PSSCHs) can be over resources that are in the same or overlapping frequency (e.g., same channel or subchannel) over different time divisions, where the time divisions may or may not be consecutive. In any case, for example, SCI component 252 can determine, from the SCI, parameters for receiving the PSSCHs, and PSSCH component 254 may accordingly receive the PSSCHs based on the parameters. As described, the various parameters in the SCI can include FDRA, TDRA, etc. of the PSSCHs, DMRS pattern for the PSSCHs, MCS for the TBs, priority class, etc. In addition, for example, PSSCH component 254 can determine other parameters for the PSSCHs, as indicated in the SCI, such as HARQ identifiers, NDI bits, RV bits, TCI state, destination identifier, etc., and can receive and/or process the PSSCHs based on these other parameters as well.

In method 500, optionally at Block 524 (e.g., for SL receiving UE 104-*b*), feedback for one or more of the multiple TBs can be transmitted. In an aspect, feedback component 256, e.g., in conjunction with processor(s) 212, memory 216, transceiver 202, communicating component 242, etc., can transmit (e.g., to the SL transmitting UE) feedback for one or more of the multiple TBs. For example, as described, the parameters in SCI (e.g., SCI-2) may include, for example, an explicit HARQ identifier indication for transmitting HARQ feedback for the first TB of the multiple TBs. In this example, feedback component 256 can transmit feedback for the first TB based on the explicit HARQ identifier, and can transmit feedback for the remaining TBs using incremental HARQ identifiers. In another example, SCI component 252 can determine whether a PSSCH is a transmission or retransmission based on determining the NDI bit of the multiple NDI bits that relates to the PSSCH. In addition, for example, feedback component 256 can generate feedback based on the SAI indicated in the SCI, as described. For example, where the SAI indicated in the SCI is greater than a last SAI determined for a last PSSCH of a previous transmission burst plus one, feedback component 256 pad a number of zeros equal to the difference in the feedback, such to indicate that PSSCHs for the missing SAIs were not received. In these examples, feedback component 256 can transmit the feedback in resources determined based on parameters indicated in the SCI, such as K1, which can indicate an offset in time divisions from the last PSSCH for transmitting the feedback, PM, which can indicate the SLFI resource index, etc.

In method 500, optionally at Block 526 (e.g., for SL receiving UE 104-*b*), one or more retransmissions of the multiple TBs of shared channel communications can be received, from the transmitting UE (e.g., a SL transmitting UE 104-*a*) and based on the SCI. In an aspect, PSSCH component 254, e.g., in conjunction with processor(s) 212, memory 216, transceiver 202, communicating component 242, etc., can receive, from the transmitting UE and based on the SCI, the one or more retransmissions of the multiple TBs of shared channel communications. For example, PSSCH component 254 may receive the retransmissions of the one or more of the multiple TBs based on feedback transmitted to the SL transmitting UE, as described above. In addition, for example, PSSCH component 254 can receive the one or more retransmissions over resources determined for receiving retransmissions, as described above.

FIG. 6 illustrates a flow chart of an example of a method 600 for scheduling resources for a single SCI scheduling multiple TBs of shared channel communications. In an example, a base station (e.g., base station 102) can perform the functions described in method 600 using one or more of the components described in FIGS. 1 and 3.

In method 600, at Block 602, a request to schedule multiple TBs of shared channel transmissions using a single SCI can be received from the transmitting UE. In an aspect, SL resource scheduling component 352, e.g., in conjunction with processor(s) 312, memory 316, transceiver 302, configuring component 342, etc., can receive, from the transmitting UE in SL communications (e.g., SL transmitting UE 104-*a*), the request to schedule multiple TBs of shared channel transmissions using a single SCI. For example, SL resource scheduling component 352 can receive the request over a Uu interface from the transmitting UE (e.g., over a physical uplink control channel (PUCCH), physical uplink shared channel (PUSCH), etc.). In one example, the request can include, or can be based on, a BSR of the SL transmitting UE indicating an amount of data to be transmitted over the sidelink shared channel.

In method 600, at Block 604, a scheduling grant indicating resources for transmitting the multiple TBs of shared channel transmissions and the single SCI can be transmitted to the UE. In an aspect, SL resource scheduling component 352, e.g., in conjunction with processor(s) 312, memory 316, transceiver 302, configuring component 342, etc., can transmit, to the UE, the scheduling grant indicating the resources for transmitting the multiple TBs of shared channel transmissions and the single SCI. In one example, SL resource scheduling component 352 can generate the scheduling grant based on the request from the UE (e.g., to indicate resources sufficient to transmit the data in the buffer).

For example, SL resource scheduling component 352 can generate the scheduling grant to include a burst of PSSCH resources and SCI embedded in the PSSCH resources, as described with reference to FIG. 7. In another example, SL resource scheduling component 352 can generate the scheduling grant to include a burst of PSSCH resources and SCI decoupled from the PSSCH resources, as described with reference to FIG. 8. In another example, SL resource scheduling component 352 can indicate, to the transmitting UE, one or more resource pools for selecting resources for transmitting SCI and PSSCH, as described herein. Moreover, in an example, SL resource scheduling component 352 can generate the scheduling grant to include resources for possibly retransmitting one or more of the multiple TBs of PSSCH, as described herein.

Figure 9:
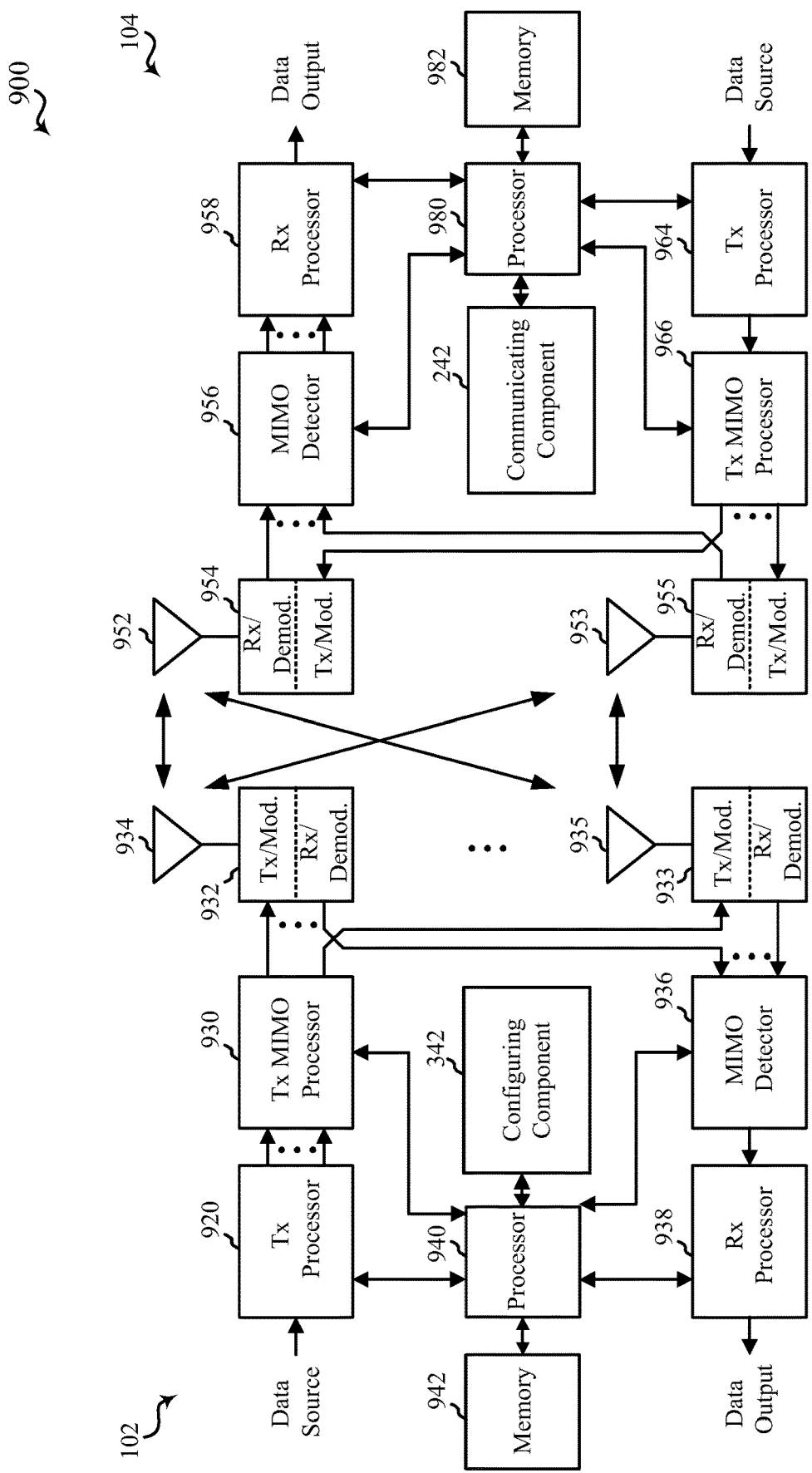
FIG. 9 is a block diagram illustrating an example of a MIMO communication system including a base station and a UE, in accordance with various aspects of the present disclosure.

FIG. 9 is a block diagram of a MIMO communication system 900 including a base station 102 and a UE 104, in accordance with various aspects of the present disclosure. The MIMO communication system 900 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications, and as such, base station 102 could be another UE 104 having a communicating component 242.

The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a configuring component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method for wireless communication by a transmitting UE in sidelink communications including transmitting, to a receiving UE, a SCI that schedules multiple TBs of shared channel communications in multiple time divisions, and transmitting, to the receiving UE and based on the SCI, the multiple TBs of shared channel communications in the multiple time divisions.

In Aspect 2, the method of Aspect 1 includes where transmitting the SCI includes transmitting the SCI in a first time division of the multiple time divisions.

In Aspect 3, the method of any of Aspects 1 or 2 includes where transmitting the SCI includes transmitting the SCI in a different time division than the multiple time divisions.

In Aspect 4, the method of Aspect 3 includes where transmitting the SCI includes transmitting the SCI in a different frequency resource pool than the multiple TBs.

In Aspect 5, the method of any of Aspects 1 to 4 includes where the SCI indicates a count of the multiple time divisions, including at least one of indicating a count of contiguous time divisions, or indicating a time division index for each of the multiple time divisions.

In Aspect 6, the method of Aspect 5 includes where the SCI further indicates a starting index for a first time division of the multiple time divisions.

In Aspect 7, the method of any of Aspects 1 to 6 includes where the SCI indicates, for at least one of the multiple TBs, at least one of a separate HARQ identifier, a separate redundancy version, or a separate new data indicator.

In Aspect 8, the method of Aspect 7 includes where the SCI indicates at least one of the separate HARQ identifier, the separate redundancy version, or the separate new data indicator in a second stage of the SCI.

In Aspect 9, the method of any of Aspects 1 to 8 includes where the SCI indicates, for the multiple TBs, at least one of a common MCS, a common frequency domain resource allocation, a common DMRS pattern, a common priority class, a common TCI state, or a common destination identifier.

In Aspect 10, the method of Aspect 9 includes where the SCI indicates at least one of the common MCS, the common frequency domain resource allocation, the common DMRS pattern, the common priority class, the common TCI state, or the common destination identifier in a second stage of the SCI.

In Aspect 11, the method of any of Aspects 1 to 10 includes where the SCI indicates one or more time division resources reserved for retransmitting one or more of the multiple TBs in different time divisions than the multiple time divisions.

In Aspect 12, the method of Aspect 11 includes where the SCI indicates the one or more time division resources reserved for retransmitting one or more of the multiple TBs in a time domain resource allocation field as a time division offset from a first one of the shared channel communications.

In Aspect 13, the method of any of Aspects 11 or 12 includes where the time domain resource allocation field is a legacy field in a first stage SCI used to indicate time domain resource allocation of a single shared channel communication.

In Aspect 14, the method of any of Aspects 1 to 13 includes where the SCI indicates a frequency domain resource allocation for retransmitting one or more of the multiple TBs, where the frequency domain resource allocation is in a legacy field in a first stage SCI used to indicate frequency domain resource allocation of a single shared channel communication.

In Aspect 15, the method of any of Aspects 1 to 14 includes where the SCI indicates one or more time division resources reserved for transmitting a retransmission SCI that schedules one or more other time division resources reserved for retransmitting one or more of the multiple TBs in different time divisions than the multiple time divisions.

In Aspect 16, the method of any of Aspects 1 to 15 includes where the SCI indicates one or more parameters related to transmitting multiple HARQ feedback bits corresponding to multiple time divisions in a codebook.

In Aspect 17, the method of Aspect 16 includes where the one or more parameters include at least one of a time division offset from a time division of a last one of the multiple TBs from which to transmit the multiple HARQ feedback bits, a PM indicating a frequency at which to transmit the multiple HARQ feedback bits, or a SAI indicating an index of at least a first one of the multiple TBs for which HARQ feedback is to be transmitted.

In Aspect 18, the method of Aspect 17 includes increasing the SAI from a last SAI associated with a last shared channel transmission in a previous SCI.

Aspect 19 is a method for wireless communication by a receiving UE in sidelink communications including receiving, from a transmitting UE, a SCI that schedules multiple TBs of shared channel communications in multiple time divisions, and receiving, from the transmitting UE and based on the SCI, the multiple TBs of shared channel communications in the multiple time divisions.

In Aspect 20, the method of Aspect 19 includes where receiving the SCI includes receiving the SCI in a first time division of the multiple time divisions.

In Aspect 21, the method of any of Aspects 19 or 20 includes where receiving the SCI includes receiving the SCI in a different time division than the multiple time divisions.

In Aspect 22, the method of Aspect 21 includes where receiving the SCI includes receiving the SCI in a different frequency resource pool than the multiple TBs.

In Aspect 23, the method of any of Aspects 19 to 22 includes where the SCI indicates a count of the multiple time divisions, including at least one of indicating a count of contiguous time divisions, or indicating a time division index for each of the multiple time divisions.

In Aspect 24, the method of Aspect 23 includes where the SCI further indicates a starting index for a first time division of the multiple time divisions.

In Aspect 25, the method of any of Aspects 19 to 24 includes where the SCI indicates, for at least one of the multiple TBs, at least one of a separate HARQ identifier, a separate redundancy version, or a separate new data indicator.

In Aspect 26, the method of Aspect 25 includes where the SCI indicates the separate HARQ identifier for a first one of the multiple TBs, and further comprising, determining for a different one of the multiple TBs, the HARQ identifier based on applying an offset to the separate HARQ identifier.

In Aspect 27, the method of any of Aspects 25 or 26 includes where the SCI indicates at least one of the separate HARQ identifier, the separate redundancy version, or the separate new data indicator in a second stage of the SCI.

In Aspect 28, the method of any of Aspects 19 to 27 includes where the SCI indicates, for the multiple TBs, at least one of a common MCS, a common frequency domain resource allocation, a common DMRS pattern, a common priority class, a common TCI state, or a common destination identifier.

In Aspect 29, the method of Aspect 28 includes where the SCI indicates at least one of the common MCS, the common frequency domain resource allocation, the common DMRS pattern, the common priority class, the common TCI state, or the common destination identifier in a second stage of the SCI.

In Aspect 30, the method of any of Aspects 19 to 29 includes where the SCI indicates one or more time division resources reserved for retransmitting one or more of the multiple TBs in different time divisions than the multiple time divisions.

In Aspect 31, the method of Aspect 30 includes where the SCI indicates the one or more time division resources reserved for retransmitting one or more of the multiple TBs in a time domain resource allocation field as a time division offset from a first one of the multiple TBs.

In Aspect 32, the method of any of Aspects 30 or 31 includes where the time domain resource allocation field is a legacy field in a first stage SCI used to indicate time domain resource allocation of a single shared channel communication.

In Aspect 33, the method of any of Aspects 19 to 32 includes where the SCI indicates a frequency domain resource allocation for retransmitting one or more of the multiple TBs, where the frequency domain resource allocation field is a legacy field in a first stage SCI used to indicate frequency domain resource allocation of a single shared channel communication.

In Aspect 34, the method of any of Aspects 19 to 33 includes where the SCI indicates one or more time division resources reserved for transmitting a retransmission SCI that schedules one or more other time division resources reserved for retransmitting one or more of the multiple TBs in different time divisions than the multiple time divisions.

In Aspect 35, the method of Aspect 34 includes receiving, based on the retransmission SCI, a retransmission of one or more of the multiple TBs in the one or more other time divisions.

In Aspect 36, the method of any of Aspects 19 to 35 includes where the SCI indicates one or more parameters related to transmitting multiple HARQ feedback bits corresponding to multiple time divisions in a codebook, and further comprising transmitting, based on the one or more parameters, the multiple HARQ feedback bits for the multiple TBs.

In Aspect 37, the method of Aspect 36 includes where the one or more parameters include at least one of a time division offset from a time division of a last one of the multiple TBs from which to transmit the multiple HARQ feedback bits, a PRI indicating a frequency at which to transmit the multiple HARQ feedback bits, or a SAI indicating an index of at least a first one of the multiple TBs for which HARQ feedback is to be transmitted.

In Aspect 38, the method of any of Aspects 36 or 37 includes where transmitting the multiple HARQ feedback bits includes padding one or more of the multiple HARQ feedback bits based on the SAI and a size of the codebook.

Aspect 39 is a method for wireless communication by a base station including receiving, from a transmitting UE in sidelink communications, a request to schedule multiple TBs of shared channel transmissions using a single SCI, and transmitting, to the UE, a scheduling grant indicating resources for transmitting the multiple TBs of shared channel transmissions and the single SCI.

In Aspect 40, the method of Aspect 39 includes where the resources for transmitting the single SCI are within a first time division of first resources for transmitting the multiple TBs.

In Aspect 41, the method of any of Aspects 39 or 40 includes where the resources for transmitting the single SCI are within a time division separate from resources for transmitting the multiple TBs.

In Aspect 42, the method of Aspect 41 includes where the resources for transmitting the single SCI are within a different frequency resource pool than the multiple TBs.

In Aspect 43, the method of any of Aspects 39 to 42 includes where the scheduling grant includes resources for retransmitting, by the transmitting UE, one or more of the multiple TBs.

Aspect 44 is an apparatus for wireless communication including a transceiver, a memory configured to store instructions, and one or more processors communicatively coupled with the memory and the transceiver, where the one or more processors are configured to execute the instructions to cause the apparatus to perform one or more of the methods of any of Aspects 1 to 43.

Aspect 45 is an apparatus for wireless communication including means for performing one or more of the methods of any of Aspects 1 to 43.

Aspect 46 is a computer-readable medium including code executable by one or more processors for wireless communications, the code including code for performing one or more of the methods of any of Aspects 1 to 43.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication as a transmitting user equipment (UE) in sidelink communications, comprising:
    a transceiver;
    a memory configured to store instructions; and
    one or more processors communicatively coupled with the memory and the transceiver, wherein the one or more processors are configured to execute the instructions to cause the apparatus to:
        transmit, to a receiving UE and in a first time division, a sidelink control information (SCI) that schedules multiple transport blocks (TBs) of shared channel communications in multiple time divisions; and
        transmit, to the receiving UE and based on the SCI, the multiple TBs of shared channel communications in the multiple time divisions.

2. The apparatus of claim 1, wherein the one or more processors are configured to execute the instructions to cause the apparatus to transmit the SCI in a first time division of the multiple time divisions.

3. The apparatus of claim 1, wherein the one or more processors are configured to execute the instructions to cause the apparatus to transmit the SCI in a different time division than the multiple time divisions.

4. The apparatus of claim 3, wherein the one or more processors are configured to execute the instructions to cause the apparatus to transmit the SCI in a different frequency resource pool than the multiple TBs.

5. The apparatus of claim 1, wherein the SCI indicates a count of the multiple time divisions, including at least one of indicating a count of contiguous time divisions, or indicating a time division index for each of the multiple time divisions.

6. The apparatus of claim 5, wherein the SCI further indicates a starting index for a first time division of the multiple time divisions.

7. The apparatus of claim 1, wherein the SCI indicates, for at least one of the multiple TBs, at least one of a separate hybrid automatic repeat/request (HARQ) identifier, a separate redundancy version, or a separate new data indicator.

8. The apparatus of claim 7, wherein the SCI indicates at least one of the separate HARQ identifier, the separate redundancy version, or the separate new data indicator in a second stage of the SCI.

9. The apparatus of claim 1, wherein the SCI indicates, for the multiple TBs, at least one of a common modulation and coding scheme (MCS), a common frequency domain resource allocation, a common demodulation reference signal (DMRS) pattern, a common priority class, a common transmission configuration indicator (TCI) state, or a common destination identifier.

10. The apparatus of claim 9, wherein the SCI indicates at least one of the common MCS, the common frequency domain resource allocation, the common DMRS pattern, the common priority class, the common TCI state, or the common destination identifier in a second stage of the SCI.

11. The apparatus of claim 1, wherein the SCI indicates one or more time division resources reserved for retransmitting one or more of the multiple TBs in different time divisions than the multiple time divisions.

12. The apparatus of claim 11, wherein the SCI indicates the one or more time division resources reserved for retransmitting one or more of the multiple TBs in a time domain resource allocation field as a time division offset from a first one of the shared channel communications.

13. The apparatus of claim 11, wherein a time domain resource allocation field that indicates the one or more time division resources is a legacy field in a first stage SCI used to indicate time domain resource allocation of a single shared channel communication.

14. The apparatus of claim 1, wherein the SCI indicates a frequency domain resource allocation for retransmitting one or more of the multiple TBs, wherein the frequency domain resource allocation is in a legacy field in a first stage SCI used to indicate frequency domain resource allocation of a single shared channel communication.

15. The apparatus of claim 1, wherein the SCI indicates one or more time division resources reserved for transmitting a retransmission SCI that schedules one or more other time division resources reserved for retransmitting one or more of the multiple TBs in different time divisions than the multiple time divisions.

16. The apparatus of claim 1, wherein the SCI indicates one or more parameters related to transmitting multiple hybrid automatic repeat/request (HARQ) feedback bits corresponding to multiple time divisions in a codebook.

17. The apparatus of claim 16, wherein the one or more parameters include at least one of a time division offset from a time division of a last one of the multiple TBs from which to transmit the multiple HARQ feedback bits, a physical resource indicator (PRI) indicating a frequency at which to transmit the multiple HARQ feedback bits, or a sidelink acknowledgement index (SAI) indicating an index of at least a first one of the multiple TBs for which HARQ feedback is to be transmitted.

18. The apparatus of claim 17, wherein the one or more processors are further configured to execute the instructions to cause the apparatus to increase the SAI from a last SAI associated with a last shared channel transmission in a previous SCI.

19. An apparatus for wireless communication as a receiving user equipment (UE) in sidelink communications, comprising:
    a transceiver;
    a memory configured to store instructions; and
    one or more processors communicatively coupled with the memory and the transceiver, wherein the one or more processors are configured to execute the instructions to cause the apparatus to:
        receive, from a transmitting UE and in a first time division, a sidelink control information (SCI) that schedules multiple transport blocks (TBs) of shared channel communications in multiple time divisions; and receive, from the transmitting UE and based on the SCI, the multiple TBs of shared channel communications in the multiple time divisions.

20. The apparatus of claim 19, wherein the one or more processors are configured to execute the instructions to cause the apparatus to receive the SCI in a first time division of the multiple time divisions.

21. The apparatus of claim 19, wherein the one or more processors are configured to execute the instructions to cause the apparatus to receive the SCI in a different time division than the multiple time divisions.

22. The apparatus of claim 21, wherein the one or more processors are configured to execute the instructions to cause the apparatus to receive the SCI in a different frequency resource pool than the multiple TBs.

23. The apparatus of claim 19, wherein the SCI indicates a count of the multiple time divisions, including at least one of indicating a count of contiguous time divisions, or indicating a time division index for each of the multiple time divisions.

24. The apparatus of claim 23, wherein the SCI further indicates a starting index for a first time division of the multiple time divisions.

25. The apparatus of claim 19, wherein the SCI indicates, for at least one of the multiple TBs, at least one of a separate hybrid automatic repeat/request (HARD) identifier, a separate redundancy version, or a separate new data indicator.

26. The apparatus of claim 19, wherein the SCI indicates, for the multiple TBs, at least one of a common modulation and coding scheme (MCS), a common frequency domain resource allocation, a common demodulation reference signal (DMRS) pattern, a common priority class, a common transmission configuration indicator (TCI) state, or a common destination identifier.

27. A method for wireless communication by a transmitting user equipment (UE) in sidelink communications, comprising:

transmitting, to a receiving UE and in a first time division, a sidelink control information (SCI) that schedules multiple transport blocks (TBs) of shared channel communications in multiple time divisions; and transmitting, to the receiving UE and based on the SCI, the multiple TBs of shared channel communications in the multiple time divisions.

28. The method of claim 27, wherein transmitting the SCI includes transmitting the SCI in a first time division of the multiple time divisions.

29. A method for wireless communication by a receiving user equipment (UE) in sidelink communications, comprising:

receiving, from a transmitting UE and in a first time division, a sidelink control information (SCI) that schedules multiple transport blocks (TBs) of shared channel communications in multiple time divisions; and receiving, from the transmitting UE and based on the SCI, the multiple TBs of shared channel communications in the multiple time divisions.

30. The method of claim 29, wherein receiving the SCI includes receiving the SCI in a first time division of the multiple time divisions.

* * * * *